May 2, 1961
M. W. P. STRANDBERG
2,982,903
POWER SUPPLY
Filed July 23, 1956
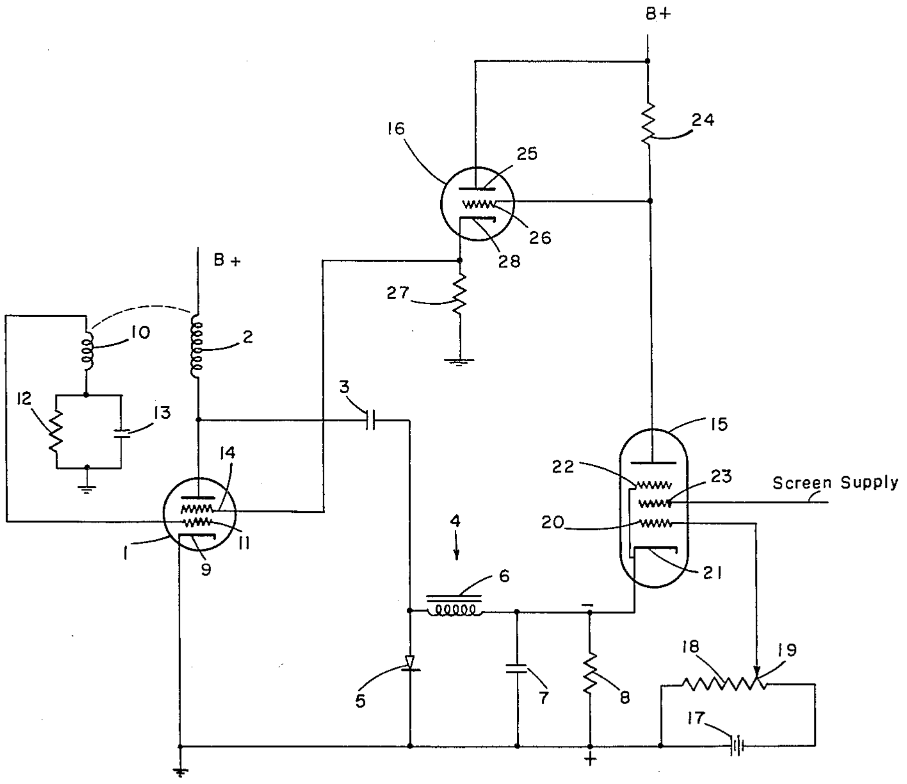
INVENTOR.
MALCOM W. P. STRANDBERG
BY William R. Sherman
HIS ATTORNEY

United States Patent Office 2,982,903 Patented May 2, 1961

2,982,903

POWER SUPPLY

Malcolm W. P. Strandberg, P.O. Box 201, Prospect St., Marshfield, Mass.

Filed July 23, 1956, Ser. No. 599,532

4 Claims. (Cl. 321—2)

The present invention relates to a power supply for producing relatively high intensity, low voltage direct current and, more particularly, to an improved direct current power supply including a high frequency oscillator and power matching circuit whereby power is efficiently delivered to a load.

High intensity, low voltage regulated direct current may be obtained from electromotive cells, but this source has the disadvantage of awkward maintenance. This type of current may also be obtained by rectifying regulated low frequency alternating current. However, for low ripple in the output, large chokes and condensers are required unless the frequency of the alternating current is high. High frequency oscillators with transformers and regulators have been built in the past, but have been so complicated that the initial and maintenance costs compare unfavorably with storage cells.

It is accordingly an object of this invention to provide a new and improved source of high intensity, low voltage direct current.

A further object of this invention is to provide a simple, inexepensive and easily maintained source of high intensity, low voltage direct current.

In accordance with the present invention, a regulated high intensity, low voltage direct current is provided by a simple regulated oscillator and a power matching network. A self-excited tuned plate-circuit oscillator is utilized in which the tank circuit for tuning the plate circuit is divided into two parallel branches, one branch containing an inductance and the other containing a load in series with a capacitor. The load comprises filtering and rectifying means in addition to a load resistance. The parallel resonant tank circuit, which of course controls the oscillator frequency, is employed additionally as a transformer, since the tank current flowing through the load is Q times the plate current. Feedback means connected between the load and the oscillator regulates the output.

Maximum power will be delivered to the load when the tank circuit is in resonance and when the load and plate resistance of the oscillator tube are matched. Automatic matching occurs in accordance with this invention over a wide range of load resistances. Since the load is coupled directly to the tank circuit, and since the tank circuit and the matching circuit are the same, matching will always be at resonance and any minor shift in oscillator frequency will not affect the output matching circuit.

In order that the invention may be more fully understood, reference is made to the accompanying drawing, in which the sole figure shows a typical circuit diagram of a representative embodiment of the present invention.

Before proceeding with a discussion of the circuit of the figure, which embodies the present invention, it will be instructive to consider a simple tuned plate circuit oscillator in which the tank in the plate circuit oscillates at a frequency $\omega$ and comprises an inductance, L, in one branch and a load resistance, R, in series with a capacitor, C, in the other parallel branch.

It is clear that maximum power exists in the tank circuit when it is at resonance and that maximum power is delivered to the load resistance when it matches the plate resistance of the tube. At resonance it can be shown that the conductance of the tank circuit is $$\frac{1}{R}\left(\frac{1}{1+(\omega RC)^{-2}}\right)$$

if it is assumed that the D.C. resistance of the inductance is small. Substituting $$Q=\frac{1}{\omega RC}$$

in the expression for tank conductance above, the conductance is $$\frac{1}{R}\left(\frac{1}{1+Q^2}\right)$$

With Q greater than 5, the conductance is about $1/RQ^2$, or the resonant tank resistance is $RQ^2$. For a match, plate resistance, $r_p$, equals tank resistance, i.e., $r_p=RQ^2$.

In the figure, vacuum tube 1 has a tank circuit in its plate circuit comprising an inductance 2 in one branch and the series combination of capacitor 3 and load 4 in the other branch. Tube 1 may suitably be a beam power pentode, for example. Load 4 comprises a rectifying and filtering means including rectifier 5, choke 6 and filter capacitor 7 and also a load resistance 8. Rectifier 5 is inserted in series between capacitor 3 and grounded cathode 9 and is conductive in the direction of cathode 9 of tube 1. A choke input type of filter comprising series choke 6 and capacitor 7 is connected across rectifier 5. Load resistance 8 is connected in series between choke 6 and ground and in parallel with shunt capacitor 7 of the choke input filter. The B+ supply is connected to the plate of tube 1 through inductance 2.

The oscillator positive feedback is through tickler coil 10. Tickler coil 10 is connected at one end to control grid 11 of tube 1 and at the other end to the grounded parallel combination of grid resistance 12 and grid capacitor 13, which, as is well known in the art, gives the oscillator a grid bias. Screen grid 14 of tube 1 provides a regulating electrode, as will be explained.

A voltage regulator for the load is provided by pentode 15, cathode follower 16 and reference battery 17. Reference battery 17 is connected to the grounded end of load resistance 8 and has connected across it a potentiometer 18. Potentiometer slide 19 is connected by a lead to control grid 20 of regulator tube 15. Cathode 21 and suppressor 22 of tube 15 are, as is conventional, tied together and also to the other end of load resistance 8. Screen grid 23 is maintained at a suitable potential by a conventional supply not shown on the drawing. Through a plate resistor 24 plate current is conducted from a B+ supply to the plate of tube 15. Plate 25 of cathode follower tube 16 is directly connected to the B+ supply, while its control grid 26 is directly coupled to the plate of tube 15. Cathode resistance 27 has one terminal grounded and the other terminal coupled with cathode 28. Cathode 28 is also connected to grid 14 of tube 1. The output of the cathode follower is thus applied to screen 14 to regulate the current supplied to the load.

In operation, the oscillator is maintained in oscillation at high frequency to develop a rectified output potential across the load resistance 8 having the polarity indicated in the figure. The feedback circuit is effective to regulate the output potential at a value determined by the setting of slide 19. For instance, an output voltage acting on load resistance 8 which is in excess of the desired amount will drive grid 20 more positive, resulting in a lower voltage being delivered to cathode follower 16 and screen grid 14. When screen grid 14 of tube 1 goes more negative, the reduction in gain lowers the level of oscillation to reduce the output voltage applied to load resistance 8 to the desired value.

The equation for optimum power matching is $r_p=RQ^2$, providing Q is greater than 5 and the resistance of inductance 2 is small. Because the parallel resonant circuit functions both as tank and transformer, this optimum power matching may be obtained at the same time that a relatively high D.C. current is supplied to the load. For varying values of load resistance, the Q of the tank circuit automatically varies so that good matching occurs over a wide range of load resistance. However, if the load resistance changes by a factor of 4, for instance, tank Q changes inversely by a factor of only about 2. Tank Q varies inversely as output voltage or directly as output current.

In a representative circuit, $f=80$ kc./sec., $C=0.02\mu f$. and $L=200$ $\mu$h. For a 6 ohm load, a Q of about 17 is required to match a plate resistance of 2000 ohms, which is an appropriate load for a suitable beam power tube. The Q of the inductance 2 may be appropriately higher than the tank circuit Q. Accordingly, the D.C. resistance of tank inductance 2 should be less than 1 ohm, in the given example. For 18 volts output the Q is 5 and for 3 amperes output the Q is 50, in which latter case half the power is lost in the tank inductance.

Maximum power delivered to the load requires that the tank circuit be at resonance and that the matching equation be satisfied. In this circuit the fact that both tank and matching circuit are the same assures that matching will always be at resonance. Furthermore, since the load is coupled directly to the tank circuit, any minor shift in oscillator frequency will not affect the output matching circuit.

While a particular embodiment of the present invention has been shown and described, it is apparent that changes and modifications may be made without departing from this invention in its broader aspects, and the invention is intended to embrace such changes and modifications as fall within the scope of the appended claims.

I claim:

1. A direct-current power supply comprising: an oscillator circuit having a parallel inductor-capacitor tuned circuit for determining the frequency of oscillation thereof; a rectifier device connected in series in one of the parallel branches of said tuned circuit; and a load impedance connected in parallel across the rectifier device for developing a direct-current output component.

2. A direct-current power supply comprising: an oscillator circuit having a parallel inductor-capacitor tuned circuit for determining the frequency of oscillation thereof; a rectifier device connected in series in the capacitor branch of said tuned circuit; and a load impedance connected in parallel across the rectifier device for developing a direct-current output component; the relationship between the effective oscillator circuit resistance $r_p$ seen by said tuned circuit, the effective resistance R of said rectifier device in parallel with said load impedance, and the Q of the capacitor branch being described by the mathematical expression $r_p=RQ^2$ thereby to obtain maximum power transfer to the tuned circuit.

3. A regulated direct-current power supply comprising: an oscillator circuit including an amplifying device having at least three electrodes and including a parallel inductor-capacitor tuned circuit coupled to at least one of said electrodes for determining the frequency of oscillation and including feedback coupling between the tuned circuit and another of said electrodes for sustaining oscillation; a rectifier device connected in series in one of the parallel branches of said tuned circuit; a load impedance connected in parallel across the rectifier device for developing a direct-current output component; and feedback circuit means responsive to said direct-current output component for supplying a direct-current control signal to one of said electrodes for controlling the amplitude of oscillation thereby to maintain substantially constant the magnitude of said direct-current output component.

4. A power supply comprising: an amplifying device including an anode, a cathode, a control grid and a screen grid; an inductance connected between said anode and a positive supply terminal; a capacitance and a load resistance connected in series between said anode and said cathode; a grid circuit inductively coupled with said inductance to sustain oscillations; a rectifier connected across said load resistance to rectify the voltage thereacross, said rectifier being conductive in the direction of said cathode; choke input filter means comprising a choke connected in series between said capacitance and said load resistance and a shunt capacitor connected across said load resistance; and feedback means comprising a regulator tube having an anode, a cathode and a control grid, direct-current biasing means connected to one terminal of the load resistance and to the control grid of the regulator tube, the cathode of the regulator tube being connected to the other terminal of the load resistance, an anode resistance connecting the anode of the regulator tube to a positive supply terminal, and means including a cathode follower tube coupling the anode of the regulator tube to the screen grid of said amplifying device whereby the output across said load resistance is regulated.

References Cited in the file of this patent

UNITED STATES PATENTS

| | | |
|---|---|---|
| 2,175,694 | Jones | Oct. 10, 1939 |
| 2,354,262 | Hershberger | July 25, 1944 |
| 2,374,781 | Schade | May 1, 1945 |
| 2,386,548 | Fogel | Oct. 9, 1945 |
| 2,485,652 | Parker | Oct. 25, 1949 |
| 2,543,030 | King | Feb. 27, 1951 |
| 2,565,621 | Olson | Aug. 28, 1951 |
| 2,748,242 | Baker et al. | May 29, 1956 |

FOREIGN PATENTS

| | | |
|---|---|---|
| 602,562 | Great Britain | May 28, 1948 |